US012705101B2

(12) United States Patent
Bai et al.

(10) Patent No.: US 12,705,101 B2
(45) Date of Patent: Aug. 11, 2026

(54) SYSTEM AND METHOD FOR CLOUD COORDINATED VEHICLE DATA COLLECTION

(71) Applicant: GM Global Technology Operations LLC, Detroit, MI (US)

(72) Inventors: Fan Bai, Ann Arbor, MI (US); Markus Jochim, Troy, MI (US); Douglas C. Martin, Goodrich, MI (US); Mahesh Pottelu, Shelby Township, MI (US); Ahmad El Baba, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1021 days.

(21) Appl. No.: 17/852,722

(22) Filed: Jun. 29, 2022

(65) Prior Publication Data

US 2024/0004715 A1 Jan. 4, 2024

(51) Int. Cl.
*G06F 9/50* (2006.01)
*G07C 5/08* (2006.01)

(52) U.S. Cl.
CPC ......... *G06F 9/5033* (2013.01); *G07C 5/0841* (2013.01)

(58) Field of Classification Search
CPC ............. G06F 9/5033; G06F 2209/502; G06F 2209/509; G06F 9/5027; G06F 9/5072; G06F 9/5088; G06F 9/541; G06F 9/5083; G07C 5/0841; G07C 5/008
See application file for complete search history.

(56) References Cited

U.S. PATENT DOCUMENTS 4,473,045 A * 9/1984 Bolander ................ F02D 41/22 123/481
6,110,220 A * 8/2000 Dave ..................... G06F 9/4887 716/108

(Continued)

FOREIGN PATENT DOCUMENTS

CN 111182495 A 5/2020
DE 102019111680 A1 12/2019
DE 102020101704 A1 8/2020

*Primary Examiner* — Omar F Fernandez Rivas
(74) *Attorney, Agent, or Firm* — Vivacqua Crane, PLLC

(57) ABSTRACT

A system for cloud coordinated vehicle data collection includes an onboard vehicle data management subsystem and a remotely-located back-office subsystem. Each subsystem includes one or more control modules having a processor, a memory, and input/output (I/O) ports. The control modules execute program code portions stored in memory. A first program code portion collects vehicle data from onboard vehicle data sources. A second program code portion determines which of several distinct communications systems will be used to transmit the vehicle data to the remotely-located back-office subsystem. A third program code portion causes the remotely-located back-office subsystem to allocate data processing tasks to specific computing resources. A fourth program code portion causes the onboard vehicle data management subsystem and the remotely-located back-office subsystem to continuously adjust data processing task allocation between onboard vehicle control modules and remotely located back-office control modules by minimizing costs and honoring task deadlines and resource consumption constraints.

17 Claims, 3 Drawing Sheets

(56) References Cited

U.S. PATENT DOCUMENTS

| | | | | |
|---|---|---|---|---|
| 6,532,533 | B1 * | 3/2003 | Bhandal | G06F 9/30101 712/E9.019 |
| 10,118,548 | B1 * | 11/2018 | Fields | G08G 1/005 |
| 12,470,489 | B2 * | 11/2025 | Peri | H04L 47/225 |
| 2019/0171368 | A1 * | 6/2019 | Chen | G06F 3/0613 |
| 2019/0340033 | A1 * | 11/2019 | Ganteaume | H04L 43/16 |
| 2019/0379592 | A1 * | 12/2019 | Samadi | H04L 41/145 |
| 2023/0267831 | A1 * | 8/2023 | Wang | G08G 1/0133 |
| 2023/0316816 | A1 * | 10/2023 | O'Grady | G07C 5/008 701/31.4 |

* cited by examiner

SYSTEM AND METHOD FOR CLOUD COORDINATED VEHICLE DATA COLLECTION

INTRODUCTION

The present disclosure relates to vehicle control and communications systems, and more specifically to data collection systems and methods for vehicles. Motor vehicles are increasingly being equipped with networked systems that communicate both internally, i.e. onboard, and externally, i.e. with other vehicles or remotely located infrastructure via a variety of wireless and/or wired communication systems. Vehicle control systems generate data relating to a wide range of vehicle attributes, from entertainment and climate-control functions to vehicle dynamics and safety systems. Data collection systems, both onboard and remote, receive large quantities of data relating to such vehicle attributes. The data collection systems may then report relevant data to databases for further analysis, or provide feedback to the vehicle control and communications systems based on prior information. Thus, current vehicle control and communications systems achieve their intended purpose in these respects. However, technological and regulatory advances continue to influence the manner of communication between onboard vehicle control and communications systems and the remote systems with which they communicate. Additionally, while some vehicles have onboard systems that are over-the-air (OTA) updatable, others require physical network connections and still others are not updatable at all.

Accordingly, there is a need for a new and improved system and method for coordinated vehicle data collection that allows for platform and vehicle flexibility, upgradability on both the vehicular end and the remote end of the system, and which operate on preexisting hardware as well as new hardware while maintaining or decreasing the cost of manufacture, assembly, and operation.

SUMMARY

According to an aspect of the present disclosure a system for cloud coordinated vehicle data collection includes an onboard vehicle data management subsystem; and a remotely-located back-office subsystem. Each of the onboard vehicle data management subsystem and the remotely located back-office subsystem include one or more control modules. Each of the one or more control modules has a processor, a memory, and input/output (I/O) ports. The control module executes program code portions stored in the memory. A first program code portion collects vehicle data from onboard vehicle data sources. A second program code portion determines which of several distinct communications systems will be used to transmit the vehicle data to the remotely-located back-office subsystem. A third program code portion causes the remotely-located back-office subsystem to allocate data processing tasks to specific computing resources. A fourth program code portion causes the onboard vehicle data management subsystem and the remotely-located back-office subsystem to continuously adjust data processing task allocation between onboard vehicle control modules and remotely located back-office control modules by minimizing costs and honoring task deadlines and resource consumption constraints.

In another aspect of the present disclosure the onboard vehicle data management subsystem further includes an intelligent data transmission pipe selection module; a vehicle data processing module (VDPM); a vehicle cache management module (VCMM); and a serial data communication adapter (SDCA).

In still another aspect of the present disclosure the VDPM further includes control logic that executes code that is uploaded from the remotely located back-office subsystem to the vehicle to support application tasks including: processing data and providing data fusion among different types of vehicle data.

In still another aspect of the present disclosure the SDCA further includes control logic that converts vehicle serial data into data formats required by the VDPM via data classification, data up/down sampling, filtering, threshold testing, and data fidelity processing.

In still another aspect of the present disclosure the vehicle cache management module further includes control logic that stores, caches, and manages a delay-tolerant vehicle serial data; and control logic that offloads the delay-tolerant vehicle serial data when an appropriate onboard vehicle data management subsystem-to-back-office subsystem communications channel is available.

In still another aspect of the present disclosure the intelligent data transmission pipe selection module further includes control logic that selectively chooses a data communication channel to transmit vehicle data from the vehicle cache management module to the remotely located back-office subsystem.

In still another aspect of the present disclosure the remotely-located back-office subsystem further includes an intelligent task assignment module (ITAM); and a vehicle data management module.

In still another aspect of the present disclosure the ITAM further includes control logic that assigns tasks to control modules in the remotely-located back-office subsystem and in the onboard vehicle data management subsystem based on a global optimization goal, including: splitting and allocation of computational tasks to vehicles or geographic and temporal regions or cloud backend resources.

In still another aspect of the present disclosure the vehicle data management module further includes control logic that collects data from a fleet of vehicles; and processes the data for internal and third-party applications.

In still another aspect of the present disclosure the control logic for splitting and allocation of computational tasks further includes one or more of: an integer linear programming (ILP) algorithm with a Lagrange optimization solution that obtains a globally optimal solution; and a vehicle-centric heuristic algorithm that obtains a locally optimal solution requiring fewer computational resources than a solution obtained by the ILP algorithm.

In still another aspect of the present disclosure the fourth program code portion is executed by a performance monitoring and debugging module. The fourth program code portion further includes control logic that, once tasks are allocated to onboard-vehicle control modules, causes the remotely-located back-office subsystem to continuously monitor computational and communications resource consumption; and upon observed underutilization or overutilization of computational and/or communications resources, re-allocates tasks between vehicles; or sends control parameters to alter computational and/or communications resource requirements for tasks.

In still another aspect of the present disclosure a method for cloud coordinated vehicle data collection includes utilizing an onboard vehicle data management subsystem and a remotely-located back-office subsystem. Each of the onboard vehicle data management subsystem and the remotely located back-office subsystem include one or more control modules. Each of the one or more control modules has a processor, a memory, and input/output (I/O) ports. The control module executes program code portions stored in the memory. The program code portions collecting vehicle data from onboard vehicle data sources; determining which of several distinct communications systems will be used to transmit the vehicle data to the remotely-located back-office subsystem; causing the remotely-located back-office subsystem to allocate data processing tasks to specific computing resources; and causing the onboard vehicle data management subsystem and the remotely-located back-office subsystem to continuously adjust data processing task allocation between onboard vehicle control modules and remotely located back-office control modules by minimizing costs and honoring task deadlines and resource consumption constraints.

In still another aspect of the present disclosure utilizing the onboard vehicle data management subsystem further includes converting, with a serial data communication adapter (SDCA), vehicle serial data into predetermined data formats via data classification, data up/down sampling, filtering, threshold testing, and data fidelity processing.

In still another aspect of the present disclosure utilizing the onboard vehicle data management subsystem further includes executing, with a vehicle data processing module (VDPM), code that is uploaded from the remotely located back-office subsystem to a vehicle to support application tasks including: processing data and providing data fusion among different types of vehicle data.

In still another aspect of the present disclosure utilizing the onboard vehicle data management subsystem further includes storing, caching, and managing delay-tolerant vehicle serial data with a vehicle cache management module (VCMM); and offloading the delay-tolerant vehicle serial data when an appropriate onboard vehicle data management subsystem-to-back-office subsystem communications channel is available.

In still another aspect of the present disclosure utilizing the onboard vehicle data management system further includes selecting, with an intelligent data transmission pipe selection module, a data communication channel to transmit vehicle data from the vehicle cache management module to the remotely located back-office subsystem.

In still another aspect of the present disclosure utilizing the remotely-located back-office subsystem further includes assigning, with an intelligent task assignment module (ITAM), tasks to control modules in the remotely-located back-office subsystem and in the onboard vehicle data management subsystem based on a global optimization goal, including: splitting and allocating computational tasks to vehicles, remotely-located back-office subsystem resources, and which are considered within given geographic and temporal regions or cloud backend resources; and collecting data from a fleet of vehicles with a vehicle data management module, the vehicle data management module processing the data for internal and third-party applications.

In still another aspect of the present disclosure splitting and allocating computational tasks further includes one or more of: applying an integer linear programming (ILP) algorithm with a Lagrange optimization solution that obtains a globally optimal solution; and applying a vehicle-centric heuristic algorithm that obtains a locally optimal solution requiring fewer computational resources than a solution obtained by the ILP algorithm.

In still another aspect of the present disclosure the method for cloud coordinated vehicle data collection further includes utilizing a performance monitoring and debugging module that, once tasks are allocated to onboard-vehicle control modules, causing the remotely-located back-office subsystem to continuously monitor computational and communications resource consumption; and upon observed underutilization or overutilization of computational and/or communications resources, re-allocating tasks between vehicles; or sending control parameters to alter computational and/or communications resource requirements for tasks.

In still another aspect of the present disclosure a system for cloud coordinated vehicle data collection includes an onboard vehicle data management subsystem a remotely-located back-office subsystem. Each of the onboard vehicle data management subsystem and the remotely located back-office subsystem include one or more control modules. Each of the one or more control modules has a processor, a memory, and input/output (I/O) ports. The control module executes program code portions stored in the memory. The one or more control modules include a vehicle data processing module (VDPM); a vehicle cache management module (VCMM); an intelligent data transmission pipe selection module; a serial data communication adapter (SDCA); a performance monitoring and debugging module; an intelligent task assignment module (ITAM); and a vehicle data management module. The VDPM executes control logic that is uploaded from the remotely located back-office subsystem to the vehicle to support application tasks including: processing data and providing data fusion among different types of vehicle data. The VCMM executes control logic that stores, caches, and manages a delay-tolerant vehicle serial data; and control logic that offloads the delay-tolerant vehicle serial data when an appropriate onboard vehicle data management subsystem-to-back-office subsystem communications channel is available. The intelligent data transmission pipe selection module executes control logic that selectively chooses a data communication channel to transmit vehicle data from the VCMM module to the remotely located back-office subsystem. The SDCA executes control logic that converts vehicle serial data into data formats required by the VDPM via data classification, data up/down sampling, filtering, threshold testing, and data fidelity processing. The ITAM executes control logic that assigns tasks to control modules in the remotely-located back-office subsystem and in the onboard vehicle data management subsystem based on a global optimization goal, including: applying an integer linear programming (ILP) algorithm with a Lagrange optimization solution that obtains a globally optimal solution; and applying a vehicle-centric heuristic algorithm that obtains a locally optimal solution requiring fewer computational resources than a solution obtained by the ILP algorithm. The ILP and vehicle centric heuristic algorithms split and allocate computational tasks to vehicles or geographic and temporal regions or cloud backend resources. The vehicle data management module executes control logic that collects data from a fleet of vehicles and processes the data for internal and third-party applications. The performance monitoring and debugging module executes control logic that causes the onboard vehicle data management subsystem and the remotely-located back-office subsystem to continuously monitor computational and communications resource consumption once tasks are allocated to onboard-vehicle control modules, and upon observed underutilization or overutilization of computational and/or communications resources, re-allocates tasks between vehicles or sends control parameters to alter computational and/or communications resource requirements for tasks, and thereby minimizing costs and honoring task deadlines and resource consumption constraints.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In the claims and specification, certain elements are designated as "first", "second", "third", "fourth", "fifth", "sixth", and "seventh", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

Figure 1A:
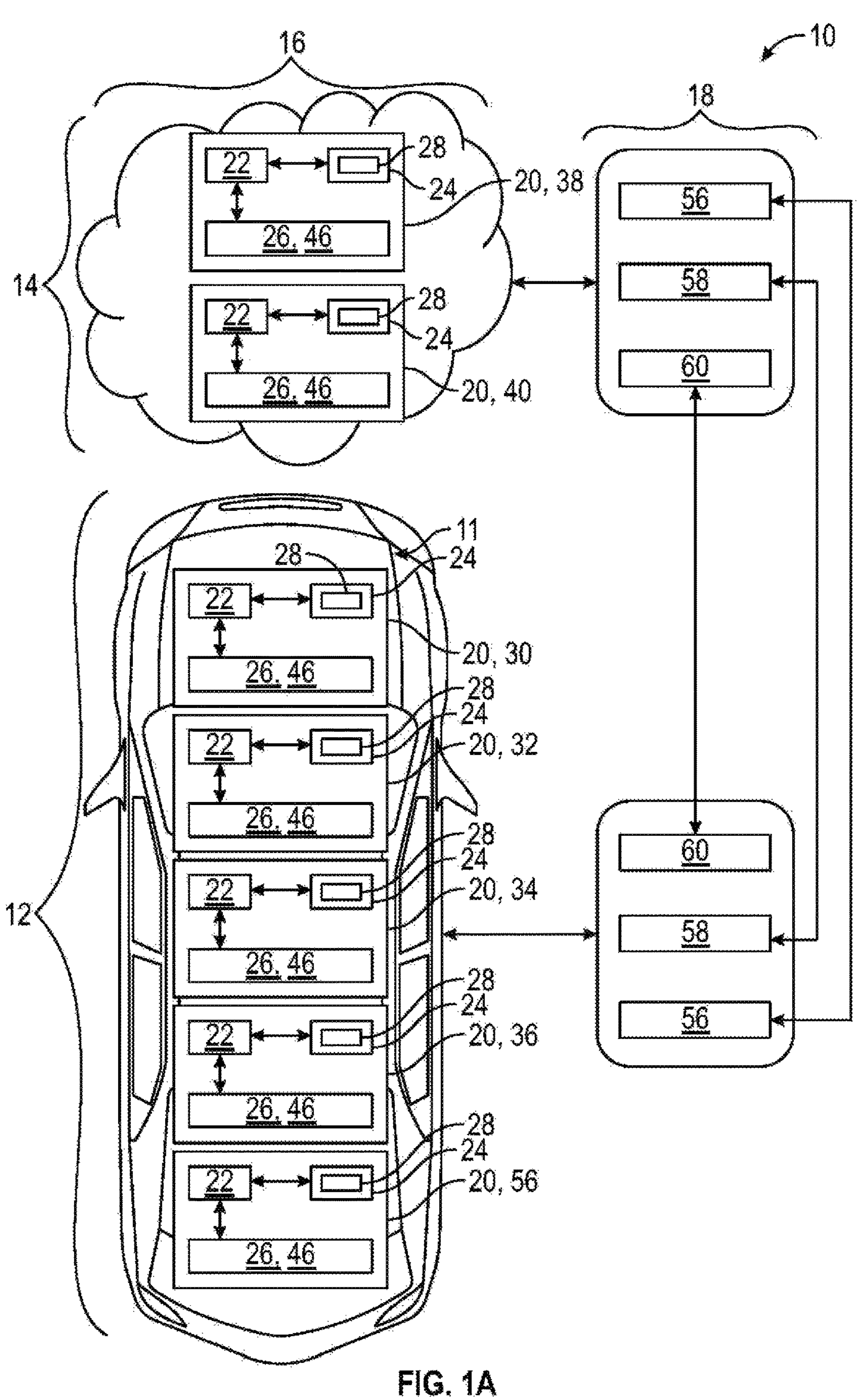
FIG. 1A is a schematic diagram of a system for cloud coordinated vehicle data collection according to an aspect of the present disclosure.
Figure 1B:
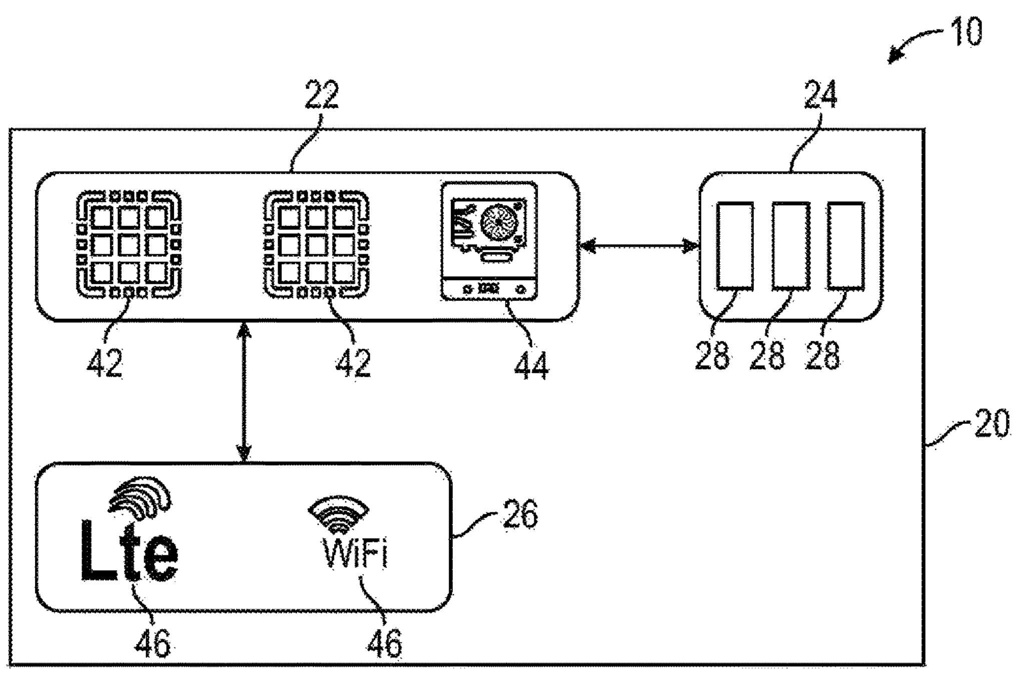
FIG. 1B is a schematic diagram of a control module of the system for cloud coordinated vehicle data collection of FIG. 1A according to an aspect of the present disclosure.

Referring now to FIGS. 1A and 1B, a system 10 for cloud coordinated vehicle 11 data collection is shown. The system 10 operates on onboard vehicle data management 12 and remotely-located back-office 14 computational subsystems. More specifically, the system 10 operates end-to-end and provides a fine-granularity, elastic coordination between the onboard vehicle data management computational subsystem 12 and the back-office computational subsystem 14 through seamless data plane 16 and control-plane 18 coordination based on available resources using a variety of scheduling algorithms with varying levels of sophistication.

The onboard vehicle data management subsystem 12 and the back-office computational subsystem 14 are each composed of one or more control modules 20. The control modules 20 are non-generalized, electronic control devices having a preprogrammed digital computer or processor 22, non-transitory computer readable medium or memory 24 used to store data such as control logic, software applications, instructions, computer code, data, lookup tables, etc., and a transceiver or input/output (I/O) ports 26. Memory 24 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 24 excludes wired, wireless, optical, or other communication links that transport transitory electrical or other signals. A non-transitory computer memory 24 includes media where data may be permanently stored and media where data can be stored and later overwritten, such as a rewritable optical disc or an erasable memory device. Computer code includes any type of program code, including source code, object code, and executable code. The processor 22 is configured to execute the code or instructions. The control modules 20 may also be dedicated Wi-Fi controllers, engine control modules, transmission control modules, body control modules, infotainment control modules, or the like. The I/O ports 26 are configured to communicate wirelessly or through wired means with known means, including Wi-Fi protocols under IEEE 802.11x.

The control modules 20 may further include one or more applications 28. An application 28 is a software program configured to perform a specific function or set of functions. The application 28 may include one or more computer programs, algorithms, software components, sets of instructions, procedures, functions, objects, classes, instances, related data, or a portion thereof adapted for implementation in a suitable computer readable program code. The applications 28 may be stored within the memory 24 or in additional or separate memory 24.

The data plane 16 is composed of the onboard vehicle data management subsystem 12 and the back-office computational subsystem 14. The control modules 20 of the onboard vehicle data management subsystem 12 include a serial data communication adapter (SDCA) 30, a vehicle data processing module (VDPM) 32, a vehicle cache management module (VCMM) 34, and an intelligent data transmission pipe selection module 36. Further control modules 20 may be included as well without departing from the scope or intent of the present disclosure.

The SDCA 30 contains one or more applications 28 or computer code portions that, when executed, convert vehicle 11 serial data into data formats understood and accepted by application tasks executed within the VDPM 32 via data up and/or down sampling, filtering, threshold testing, and data fidelity processing. The VDPM 32 executes applications 28 or computer code portions that may be uploaded from the back-office computational subsystem 14 to support application tasks. Application tasks are used to develop data insights for back-office computational subsystem 14 tasks through processing data and fusing together various different types of vehicle 11 data such as vehicle telemetry, telematics, infotainment data and the like. In several aspects, the VCMM 34 is embedded hardware that executes applications 28 or computer code portions that store, cache, and manage certain delay-tolerant vehicle 11 serial data in large volumes. That is, some vehicle 11 data, such as vehicle 11 dynamics data relating to safety system performance, active vehicle 11 handling, or other such real-time response-required systems are not delay-tolerant. Accordingly, such non-delay-tolerant vehicle 11 serial data is given computational and communications priority over delay-tolerant system 10 data where appropriate. Delay-tolerant data may relate to non safety-critical systems and can be transmitted between the onboard vehicle computational subsystem 12 and back-office computational subsystem 14 continuously, periodically, or the like. For example, delay-tolerant data may be transmitted only periodically in situations where communications bandwidth limitations require that non-delay-tolerant data be prioritized for communication, such as in a physical location where wireless communications means (e.g. LTE, WiFi, or the like) have poor signal quality. The intelligent data pipe selection module 36 determines which underlying data communication channel is appropriate to transmit vehicle 11 data from the VCMM 34 to the back-office computational subsystem 14 based on application task requirements.

The control modules 20 of the back-office computational subsystem 14 include at least an intelligent task assignment module (ITAM) 38 and a cloud vehicle data management module 40. The ITAM 38 includes applications 28 or control logic to intelligently assign different application tasks to different processing units. That is as shown in FIG. 1B, which depicts a control module 20, the processors 22 each of the control modules 20 of the system 10 may include or define one or more central processing unit (CPU) cores 42 and/or graphics processing unit (GPU) modules or cores 44, as well as distinct or combined I/O ports 26 or communications pipes such as WiFi or Cellular pipes 46. The control logic in the ITAM 38 attempts to achieve a global system 10 optimization goal. In several aspects, the global optimization goal includes predefined response speed time values, and computational resource use values, and the like. That is, the ITAM 38 determines the location in which data will be computed and/or processed, how such data will be split up to improve processing speed or resource use, as well as the allocation of specific data processing or computational tasks to onboard vehicle computational subsystems 12 within or outside of a particular geographic and/or temporal region or cloud backend resources.

The cloud-based vehicle data management module 40 executes one or more applications 28 or control code portions that manage the collection of vehicle 11 data from one or more vehicles 11. In some examples, the vehicle 11 data may be collected from an entire fleet of vehicles 11 numbering hundreds, thousands, or more. The cloud-based vehicle data management module 40 obtains the vehicle 11 data stores it for further processing to develop insights that may be used by a vehicle 11 manufacturer and/or by third party vendors to further improve or adapt products based on the vehicle 11 data. The cloud-based vehicle data management module 40 may also interact with third party vendor applications through predefined APIs, or the like.

It should be appreciated that the ITAM 38 faces a significant technical challenge, namely: system 10 resources are limited, but certain task demands may be highly dynamic in nature and vary significantly from task to task. Accordingly, the ITAM 38 is used to allocate computational resources to achieve time, resource, and other such efficiency goals. Resource allocation may be modeled as an optimization problem. Such an optimization problem may include minimizing cost structures while honoring task deadlines and resource consumption constraints by assigning different job tasks to different shops having differing computational resources at their disposal. The solution to the optimization problem may be through one or more of an Integer Linear Programming (ILP) 48 and Lagrange Optimization solution 49 or by a vehicle-centric heuristic solution 50.

The ILP 48 assigns the job tasks, e.g. Task #1 . . . Task #N to one or more communications shops 52 and/or one or more computational shops 54. The communications shops 52 are data pipelines that may include cellular data over long term evolution (LTE) or the like, WiFi under 802.11x, wired, or other such communications data pipes 46. The computational shops 54 may include one or more CPUs 42, GPUs 44, or the like. The ILP 48 performs an initial cost calculation according to the following equation:

$$C(i,j)=\Sigma_i C_{comp}(i)+\Sigma_{i,j} C_{comm}(i,j) d_{comm}(i,j)$$

where $C_{comp}$ defines computational costs, $C_{comm}$ defines communications costs, and $d_{comm}$ a quantity of data to be communicated.

The ILP 48 also performs a Latency calculation according to the following equation:

$$L(i,j)=\max_m\{L_{comm}(m,j)d_{comm}(m,j)+L(m,j)\}+L_{comp}(i)$$

where $L_{comm}$(m,j) defines signal propagation latency, and $L_{comp}$(i) defines computational latency.

A simplified formulation of a problem to be solved may therefore be expressed as:

$$\min_{(i,j)\in(M,N)}\sum\sum C(i,j)$$

$$\text{s.t.}\quad (1)\ L(i,j)\ll L_{req}$$

$$(2)\ \sum_i Cap_{comp}(i)\ll Cap_{req};\ \text{and}$$

$$(3)\ \sum_i BW_{comm}(j)\ll BW_{req}.$$

where $L_{req}$ defines a threshold quantity of latency in either computational processes or communications processes that must be met for the system 10 to operate within specifications, where $\Sigma_i Cap_{comp}$(i) defines a sum of the computational capacities of the available CPUs 42 and GPUs 44, $Cap_{req}$ defines a computational capacity required by the calculations that must be carried out to complete a given task or set of tasks, $\Sigma_i BW_{comm}$(j) defines the sum of the bandwidth capacities of all available communications data pipes 46 in all available computational shops 52, and where $BW_{req}$ defines a quantity of bandwidth necessary to transmit and/or receive data needed to complete a given task or set of tasks.

The Lagrange Optimization is then applied to the cost and latency calculations to achieve a globally optimal solution that may, for any particular system, be sub-optimal. The Lagrange Optimization solution may be expressed as:

$$\min_{(i,j)\in(M,N)}\sum\sum C(i,j)+\alpha(L(i,j)-L_{req})+\beta\left(\sum_i Cap_{comp}(i)-Cap_{req}\right)+\gamma\left(\sum_i BW_{comm}(j)-BW_{req}\right)$$

In some examples, the ILP 48 and Lagrange Optimization solution 49 may be used independently of or in combination with the vehicle-centric heuristic solution 50. The vehicle-centric heuristic solution 50 is an algorithm that focuses more specifically on a local problem to be solved rather than attempting to determine a globally optimal solution for all systems combined. Accordingly, the vehicle-centric heuristic solution 50 may be a locally ideal solution which does not satisfy or generate an optimal global solution. The vehicle centric heuristic solution 50 makes use of the same communications shops 52 and/or one or more computational shops 54 as the ILP 48 and Lagrange Optimization solution 49. These communications and computational shops 52, 54 include the same data pipelines that may include cellular data over long term evolution (LTE) or the like, WiFi under 802.11x, wired, or other such communications data pipes 46 described above. The computational shops 54 may include one or more CPUs 42, GPUs 44, or the like described above.

The vehicle-centric heuristic solution 50 applies a price $p_1, p_2 \ldots p_n$ to each of the various Tasks, e.g., to Task #1, Task #2 . . . Task #N. For a given task, a cost and latency punishment function may be applied. The cost+latency punishment function may be expressed as:

$$\min_{(i,j)\in(M,N)} C(i, j) + \alpha(L(i, j) - L_{req}).$$

Accordingly, a reward-to-cost/punishment ratio for a given task k, for processor i, and for communications pipe j may be expressed as:

$$\frac{P_k}{\min_{(i,j)\in(M,N)} C(i, j) + \alpha(L(i, j) - L_{req})}$$

Tasks k are then ranked (k=0, 1, . . . , K) based on utility rankings of the reward-to-cost/punishment ratio. Based on the ranking, the resources being used (i.e. processor i, and data pipe j) is used in a localized "greedy" fashion to achieve a locally ideal solution.

Figure 2:
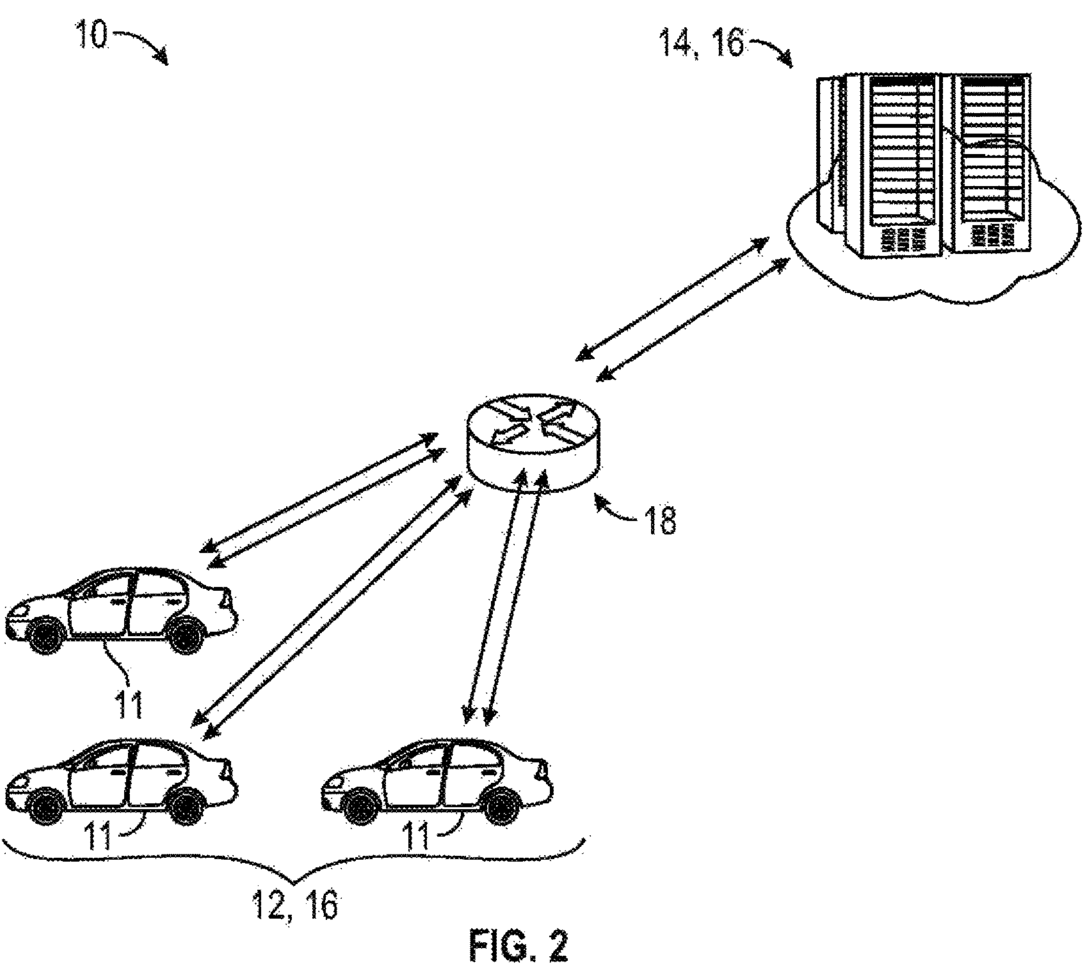
FIG. 2 is a functional diagram of data flow within the system for cloud coordinated vehicle data collection depicted in FIGS. 1A and 1B according to an aspect of the present disclosure.

Turning now to FIG. 2, and with continuing reference to FIGS. 1A and 1B, the system 10 is shown in a schematic manner. Once tasks are assigned to local vehicles 11, the back-office computational subsystem 14 continuously monitors the utilization of resources to complete job tasks at allocated vehicles 11. Based on the data from the allocated vehicles 11, the back-office computational subsystem 14 makes adjustments to accommodate necessary changes in resource utilization to complete the job tasks within predefined temporal windows. More specifically, at each vehicle 11, a performance monitoring and debugging module 56 accumulates and reports operational data, including meta data, to the back-office computational subsystem 14. Within the back-office computational subsystem 14, upon observed over or under utilization, the back-office computational subsystem 14 can re-allocate job tasks to other vehicles 11 and/or send control parameters to impact the behaviors of the tasks, thereby changing the resource requirements for each job task. For example, the back-office computational subsystem 14 can instruct certain job tasks to be executed more frequently or less frequently, in different locations, or the like. The re-allocations and/or control parameter modifications are achieved through configurations sent through the control plane 16 to control modules 20 within the data plane 18 for further processing.

Figure 3:
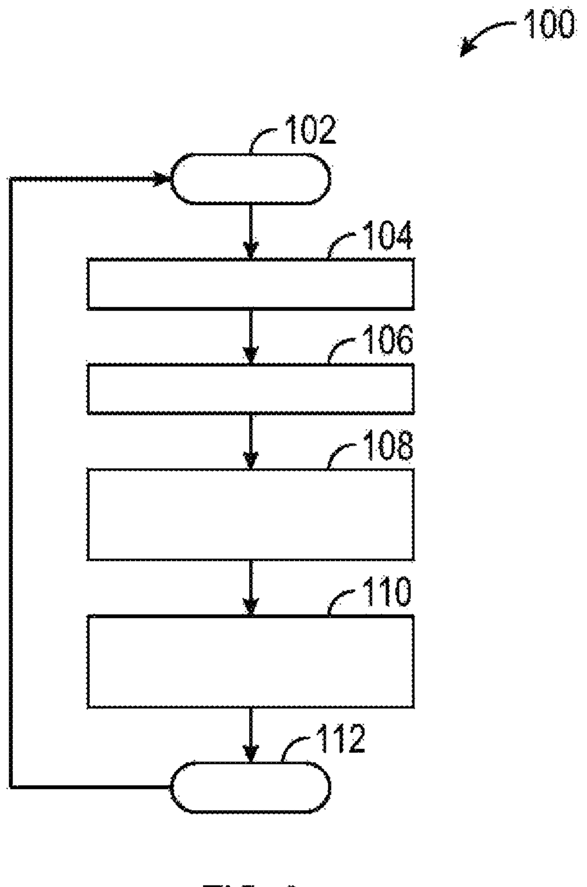
FIG. 3 is a block diagram of a method for cloud coordinated vehicle data collection according to an aspect of the present disclosure.

Turning now to FIG. 3, and with continuing reference to FIGS. 1A-2, a method 100 for cloud coordinated vehicle data collection is shown. The method 100 begins at block 102. At block 104 vehicle data is captured by onboard sensors equipped to the one or more vehicles 11 within the system 10. At block 106, the system 10 determines which of several distinct communications pipelines or systems may be used to transmit the vehicle data to the remotely-located back-office computational subsystem 14. At block 108, the remotely located back-office computational subsystem 14 allocates data processing tasks to specific computing resources either in the remotely-located back-office computational subsystem 14 or in the onboard computational subsystems 12 equipped to each vehicle 11. In some examples, the data processing may be allocated to both onboard and back-office computational subsystems 12, 14 as needed. At block 110, the system continuously monitors the data processing tasks and continuously adjusts data processing task allocation between the onboard vehicle control modules 20 and control modules 20 located in the remotely located back-office subsystem 14 minimizing or substantially eliminating costs and honoring task deadlines and resource consumption constraints. It should be appreciated that the term "minimizing", as used herein, means reducing from a first level to a second level having a lower value than the first level, or substantially eliminating. At block 112, the method 100 ends and returns to block 102 where the method 100 runs continuously.

A system and method for cloud coordinated vehicle data collection according to the present disclosure offers several advantages. These include the ability to adaptively determine required whether required data processing will take place onboard a vehicle 11, in a remote cloud-based back-office computational subsystem 14, or in a combination of the two, while supporting large quantities of vehicles 11 and the data produced thereby, and while preventing data loss. Additionally, the system 10 and method of the present disclosure provides mechanisms for seamless coordination between the cloud and vehicles 11 through control and data-plane 16, 18 coordination of system configuration 56, system state management 58, and synchronization 60 between the onboard and back-office computational subsystems 12, 14. The system 10 and method described herein may also be upgraded over-the-air (OTA), or via wired data connections, thereby allowing the system 10 and method to operate on current vehicles 11 as well as new vehicles 11 and may even be retroactively applied to vehicles 11 having appropriate hardware. Accordingly, the system 10 is hardware agnostic, can be mass-applied to vehicles 11 and back-office computational subsystems 14 on a wide variety of platforms, at low cost, and with low complexity of manufacture and application.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for cloud coordinated vehicle data collection, the system comprising:

an onboard vehicle data management subsystem, including:

an intelligent data transmission pipe selection module;

a vehicle data processing module (VDPM);

a vehicle cache management module (VCMM); and a serial data communication adapter (SDCA), wherein the SDCA further comprises:

control logic that converts vehicle serial data into data formats required by the VDPM via data classification, data up/down sampling, filtering, threshold testing, and data fidelity processing; and a remotely-located back-office subsystem, wherein each of the onboard vehicle data management subsystem and the remotely located back-office subsystem comprise:

one or more control modules, each of the one or more control modules having a processor, a memory, and input/output (I/O) ports, the control module executing program code portions stored in the memory, the program code portions comprising:

a first program code portion that collects vehicle data from onboard vehicle data sources;

a second program code portion that determines which of several distinct communications systems will be used to transmit the vehicle data to the remotely-located back-office subsystem;

a third program code portion that causes the remotely-located back-office subsystem to allocate data processing tasks to specific computing resources; and a fourth program code portion that causes the onboard vehicle data management subsystem and the remotely-located back-office subsystem to continuously adjust data processing task allocation between onboard vehicle control modules and remotely located back-office control modules by: reducing computational and communications costs from a first level to a second level having a lower value than the first level, and honoring task deadlines and resource consumption constraints.

2. The system of claim 1 wherein the VDPM further comprises:

control logic that executes code that is uploaded from the remotely located back-office subsystem to the vehicle to support application tasks including: processing data and providing data fusion among different types of vehicle data.

3. The system of claim 1 wherein the vehicle cache management module further comprises:

control logic that stores, caches, and manages a delay-tolerant vehicle serial data; and control logic that offloads the delay-tolerant vehicle serial data when an appropriate onboard vehicle data management subsystem-to-back-office subsystem communications channel is available.

4. The system of claim 1 wherein the intelligent data transmission pipe selection module further comprises:

control logic that selectively chooses a data communication channel to transmit vehicle data from the vehicle cache management module to the remotely located back-office subsystem.

5. The system of claim 1 wherein the remotely-located back-office subsystem further comprises:

an intelligent task assignment module (ITAM); and a vehicle data management module.

6. The system of claim 5 wherein the ITAM further comprises:

control logic that assigns tasks to control modules in the remotely-located back-office subsystem and in the onboard vehicle data management subsystem based on a global optimization goal, including:

splitting and allocation of computational tasks to vehicles or geographic/temporal regions or cloud backend resources.

7. The system of claim 5 wherein the vehicle data management module further comprises:

control logic that collects data from a fleet of vehicles; and processes the data for internal and third-party applications.

8. The system of claim 6 wherein the control logic for splitting and allocation of computational tasks further comprises:

an integer linear programming (ILP) algorithm with a Lagrange optimization solution that obtains a globally optimal solution; and a vehicle-centric heuristic algorithm that obtains a locally optimal solution requiring fewer computational resources than a solution obtained by the ILP algorithm.

9. The system of claim 1 wherein the fourth program code portion is executed by a performance monitoring and debugging module, wherein the fourth program code portion further comprises:

control logic that, once tasks are allocated to onboard-vehicle control modules, causes the remotely-located back-office subsystem to continuously monitor computational and communications resource consumption; and upon observed underutilization or overutilization of computational communications resources, re-allocates tasks between vehicles; and or sends control parameters to alter computational and communications resource requirements for tasks.

10. A method for cloud coordinated vehicle data collection, the method comprising:

utilizing an onboard vehicle data management subsystem and a remotely-located back-office subsystem, wherein utilizing the onboard vehicle data management subsystem includes: converting, with a serial data communication adapter (SDCA), vehicle serial data into predetermined data formats via data classification, data up/down sampling, filtering, threshold testing, and data fidelity processing, wherein each of the onboard vehicle data management subsystem and the remotely located back-office subsystem comprise:

one or more control modules, each of the one or more control modules having a processor, a memory, and input/output (I/O) ports, the control module executing program code portions stored in the memory, the program code portions:

collecting vehicle data from onboard vehicle data sources;

determining which of several distinct communications systems will be used to transmit the vehicle data to the remotely-located back-office subsystem;

causing the remotely-located back-office subsystem to allocate data processing tasks to specific computing resources; and causing the onboard vehicle data management subsystem and the remotely-located back-office subsystem to continuously adjust data processing task allocation between onboard vehicle control modules and remotely located back-office control modules by:

reducing computational and communications costs from a first level to a second level having a lower value than the first level, and honoring task deadlines and resource consumption constraints.

11. The method of claim 10 wherein utilizing the onboard vehicle data management subsystem further comprises:

executing, with a vehicle data processing module (VDPM), code that is uploaded from the remotely located back-office subsystem to a vehicle to support application tasks including: processing data and providing data fusion among different types of vehicle data.

12. The method of claim 10 wherein utilizing the onboard vehicle data management subsystem further comprises:

storing, caching, and managing delay-tolerant vehicle serial data with a vehicle cache management module (VCMM); and offloading the delay-tolerant vehicle serial data when an appropriate onboard vehicle data management subsystem-to-back-office subsystem communications channel is available.

13. The method of claim 12 wherein utilizing the onboard vehicle data management subsystem further comprises:

selecting, with an intelligent data transmission pipe selection module, a data communication channel to transmit vehicle data from the vehicle cache management module to the remotely located back-office subsystem.

14. The method of claim 10 wherein utilizing the remotely-located back-office subsystem further comprises:

assigning, with an intelligent task assignment module (ITAM), tasks to control modules in the remotely-located back-office subsystem and in the onboard vehicle data management subsystem based on a global optimization goal, including:

splitting and allocating computational tasks to vehicles, remotely-located back-office subsystem resources, and which are considered within given geographic and temporal regions or cloud backend resources; and collecting data from a fleet of vehicles with a vehicle data management module, the vehicle data management module processing the data for internal and third-party applications.

15. The method of claim 14 wherein splitting and allocating computational tasks further comprises:

applying an integer linear programming (ILP) algorithm with a Lagrange optimization solution that obtains a globally optimal solution; and applying a vehicle-centric heuristic algorithm that obtains a locally optimal solution requiring fewer computational resources than a solution obtained by the ILP algorithm.

16. The method of claim 10 further comprising:

utilizing a performance monitoring and debugging module that, once tasks are allocated to onboard-vehicle control modules, causes the remotely-located back-office subsystem to continuously monitor computational and communications resource consumption; and upon observed underutilization or overutilization of computational and communications resources, re-allocating tasks between vehicles; or sending control parameters to alter computational and communications resource requirements for tasks.

17. A system for cloud coordinated vehicle data collection, the system comprising:

an onboard vehicle data management subsystem; and a remotely-located back-office subsystem, wherein each of the onboard vehicle data management subsystem and the remotely located back-office subsystem comprise:

one or more control modules, each of the one or more control modules having a processor, a memory, and input/output (I/O) ports, the control module executing program code portions stored in the memory, the one or more control modules including:

a vehicle data processing module (VDPM);

a vehicle cache management module (VCMM);

an intelligent data transmission pipe selection module;

a serial data communication adapter (SDCA);

a performance monitoring and debugging module;

an intelligent task assignment module (ITAM); and a vehicle data management module, wherein the VDPM executes control logic that is uploaded from the remotely located back-office subsystem to the vehicle to support application tasks including: processing data and providing data fusion among different types of vehicle data, wherein the VCMM executes control logic that stores, caches, and manages a delay-tolerant vehicle serial data; and control logic that offloads the delay-tolerant vehicle serial data when an appropriate onboard vehicle data management subsystem-to-back-office subsystem communications channel is available, wherein the intelligent data transmission pipe selection module executes control logic that selectively chooses a data communication channel to transmit vehicle data from the VCMM module to the remotely located back-office subsystem;

wherein the SDCA executes control logic that converts vehicle serial data into data formats required by the VDPM via data classification, data up/down sampling, filtering, threshold testing, and data fidelity processing;

wherein the ITAM executes control logic that assigns tasks to control modules in the remotely-located back-office subsystem and in the onboard vehicle data management subsystem based on a global optimization goal, including:

applying an integer linear programming (ILP) algorithm with a Lagrange optimization solution that obtains a globally optimal solution; and applying a vehicle-centric heuristic algorithm that obtains a locally optimal solution requiring fewer computational resources than a solution obtained by the ILP algorithm, wherein the ILP and vehicle centric heuristic algorithms split and allocate computational tasks to vehicles or geographic and temporal regions or cloud backend resources; and wherein the vehicle data management module executes control logic that collects data from a fleet of vehicles; and processes the data for internal and third-party applications;

wherein the performance monitoring and debugging module executes control logic that causes the onboard vehicle data management subsystem and the remotely-located back-office subsystem to continuously monitor computational and communications resource consumption once tasks are allocated to onboard-vehicle control modules; and upon observed underutilization or overutilization of computational and communications resources, re-allocates tasks between vehicles; or sends control parameters to alter computational and communications resource requirements for tasks, and thereby minimizing: reducing computational and communications costs from a first level to a second level having a lower value than the first level, and honoring task deadlines and resource consumption constraints.

* * * * *